US011929039B2

(12) United States Patent
Shin et al.

(10) Patent No.: US 11,929,039 B2
(45) Date of Patent: Mar. 12, 2024

(54) DISPLAY DEVICE

(71) Applicant: LG Display Co., Ltd., Seoul (KR)

(72) Inventors: SeungHwan Shin, Jeonju-si (KR); WonHo Lee, Paju-si (KR); YoungMin Jeong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/977,793

(22) Filed: Oct. 31, 2022

(65) Prior Publication Data

US 2023/0215388 A1 Jul. 6, 2023

(30) Foreign Application Priority Data

Dec. 31, 2021 (KR) ........................ 10-2021-0194703

(51) Int. Cl.

*G09G 3/3291* (2016.01)
*G09G 3/3233* (2016.01)
*G09G 3/3266* (2016.01)

(52) U.S. Cl.

CPC ......... *G09G 3/3291* (2013.01); *G09G 3/3266* (2013.01); *G09G 2300/0452* (2013.01); *G09G 2300/0842* (2013.01); *G09G 2310/08* (2013.01); *G09G 2320/0233* (2013.01)

(58) Field of Classification Search

CPC ............... G09G 2300/0452; G09G 2320/0295
See application file for complete search history.

(56) References Cited

U.S. PATENT DOCUMENTS

| | | | | |
|---|---|---|---|---|
| 2006/0101325 A1* | 5/2006 | Sasaki | G09G 3/3607 | 715/275 |
| 2012/0013817 A1* | 1/2012 | Kim | G02F 1/1393 | 349/41 |
| 2012/0075281 A1* | 3/2012 | Moon | G09G 3/3648 | 345/212 |
| 2012/0262641 A1* | 10/2012 | Tsai | G09G 3/3648 | 349/43 |
| 2014/0218347 A1* | 8/2014 | Lee | G09G 3/3677 | 349/48 |
| 2014/0247200 A1* | 9/2014 | Jinta | G09G 3/3225 | 438/34 |
| 2015/0187293 A1* | 7/2015 | Yoo | G09G 3/3607 | 345/694 |
| 2015/0379947 A1* | 12/2015 | Sang | G09G 3/3607 | 349/37 |
| 2016/0163270 A1* | 6/2016 | Shiomi | G09G 3/3614 | 345/102 |

(Continued)

FOREIGN PATENT DOCUMENTS

KR 10-2022-0030884 A 3/2022

*Primary Examiner* — Sepehr Azari

(74) *Attorney, Agent, or Firm* — Birch, Stewart, Kolasch & Birch, LLP

(57) ABSTRACT

A display device can include a display panel having a plurality of pixels, each of the plurality of pixels including a plurality of sub pixels having different colors, a data driver to supply a data voltage to the plurality of pixels via a plurality of data lines, and a gate driver to supply a gate signal to the plurality of pixels via a plurality of gate lines. Also, the plurality of sub pixels are sequentially disposed in a same column, each of the plurality of data lines is divided into two sub data lines, and the two sub data lines are disposed on opposite sides of the plurality of sub pixels disposed in the same column.

20 Claims, 7 Drawing Sheets

(56) References Cited

U.S. PATENT DOCUMENTS

| | | | | |
|---|---|---|---|---|
| 2016/0268308 | A1* | 9/2016 | Cho | G02F 1/13306 |
| 2017/0345382 | A1* | 11/2017 | Sang | G02F 1/13 |
| 2019/0004383 | A1* | 1/2019 | Gao | H01L 27/124 |
| 2019/0164502 | A1* | 5/2019 | Yoon | H10K 59/353 |
| 2020/0074908 | A1* | 3/2020 | Kang | G09G 3/20 |
| 2020/0074938 | A1* | 3/2020 | Kim | G09G 3/3233 |
| 2020/0251072 | A1* | 8/2020 | Chen | G09G 5/18 |
| 2021/0150990 | A1* | 5/2021 | Byun | G09G 3/3233 |
| 2021/0193013 | A1* | 6/2021 | Xu | H10K 59/353 |

* cited by examiner

DISPLAY DEVICE

CROSS-REFERENCE TO RELATED APPLICATIONS

This application claims priority to Korean Patent Application No. 10-2021-0194703 filed on Dec. 31, 2021, in the Republic of Korea, the entirety of which is incorporated herein by reference.

BACKGROUND

Field

The present disclosure relates to a display device, and more particularly, to a display device which is capable of being driven at a high driving frequency.

Description of the Related Art

Among display devices which are used for a monitor of a computer, a television, or a cellular phone, there are an organic light emitting display device (OLED) which is a self-emitting device and a liquid crystal display device (LCD) which requires a separate light source, such as a backlight unit.

The organic light emitting display device includes a display panel including a plurality of sub pixels and a driver which drives the display panel. The driver includes a gate driver configured to supply a gate signal to the display panel and a data driver configured to supply a data voltage. When a signal, such as a gate signal and a data voltage, is supplied to a sub pixel of the organic light emitting display device, the selected sub pixel emits light to display images.

As the size of the display panel becomes larger, a double rate driving method which drives the display panel by increasing the driving frequency is used, in order to smoothly drive the display panel. As described above, when the driving frequency is increased, a time to charge a data voltage of a sub pixel is rapidly reduced so that there is an issue in that the data is not always completely charged in the sub pixel. In other words, the charging ability of the sub pixels may lag behind the refresh rate. If the sub pixels are not properly charged during each display frame, then image quality can become impaired.

SUMMARY OF THE DISCLOSURE

An object to be achieved by the present disclosure is to provide a display device including a sensing transistor which senses a characteristic value of a sub pixel.

Another object to be achieved by the present disclosure is to provide a display device which improves a data charging rate of a sub pixel.

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display device includes a display panel in which a plurality of pixels including a plurality of sub pixels having different colors is disposed; a data driver configured to supply a data voltage to the plurality of pixels via a plurality of data lines; and a gate driver configured to supply a gate signal to the plurality of pixels via a plurality of gate lines, in which the plurality of sub pixels is sequentially disposed in the same column, each of the plurality of data lines is divided into a plurality of sub data lines and each of the plurality of sub data lines is disposed on both sides of the plurality of sub pixels which is sequentially disposed in the same column.

Other detailed matters of the example embodiments are included in the detailed description and the drawings.

According to the present disclosure, resistive-capacitive (RC) delay of the data signal is reduced to increase a charging rate of the data signal.

According to the present disclosure, even in a specific pattern, the charging rate of the data signal can be constantly controlled.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
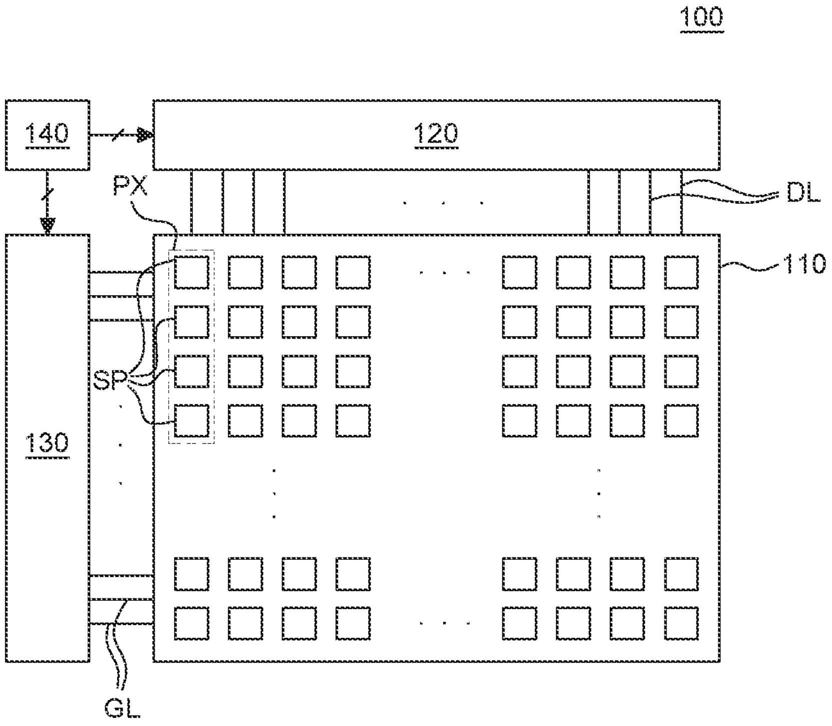
FIG. 1 is a schematic view of a display device according to an embodiment of the present disclosure.

The advantages and features of the present disclosure, and methods for accomplishing the same will be more clearly understood from example embodiments described below with reference to the accompanying drawings. However, the present disclosure is not limited to the following example embodiments but can be implemented in various different forms. The example embodiments are provided only to complete disclosure of the present disclosure and to fully provide a person with ordinary skill in the art to which the present disclosure pertains with the category of the present disclosure, and the present disclosure will be defined by the appended claims.

The shapes, dimensions, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only." Any references to singular can include plural unless expressly stated otherwise.

Components are interpreted to include an ordinary error range even if not expressly stated.

When the position relation between two parts is described using the terms such as "on," "above," "below," and "next," one or more parts can be positioned between the two parts unless the terms are used with the term "immediately" or "directly."

When an element or layer is referred to as being "on" another element or layer, it can be directly on the other element or layer, or intervening elements or layers can be present.

Although the terms "first," "second," and the like are used for describing various components, these components are not confined by these terms. These terms are merely used for distinguishing one component from the other components. Therefore, a first component to be mentioned below can be a second component in a technical concept of the present disclosure.

Throughout the whole specification, the same reference numerals denote the same elements.

Since the dimensions and thickness of each component illustrated in the drawings are represented for convenience in explanation, the present disclosure is not necessarily limited to the illustrated dimensions and thickness of each component.

The features of various embodiments of the present disclosure can be partially or entirely coupled to or combined with each other and can be interlocked and operated in technically various ways, and the embodiments can be carried out independently of or in association with each other.

Hereinafter, various example embodiments of the present disclosure will be described in detail with reference to the accompanying drawings. All the components of each display device according to all embodiments of the present disclosure are operatively coupled and configured.

A transistor used for a display device of the present disclosure can be implemented by one or more transistors among n-channel transistors (NMOS) and p-channel transistors (PMOS). The transistor can be implemented by an oxide semiconductor transistor having an oxide semiconductor as an active layer or an LTPS transistor having a low temperature poly-silicon (LTPS) as an active layer. The transistor can include at least a gate electrode, a source electrode, and a drain electrode. The transistor can be implemented as a thin film transistor on a display panel. In the transistor, carriers flow from the source electrode to the drain electrode. In the situation of the n-channel transistor (NMOS), since the carriers are electrons, in order to allow the electrons to flow from the source electrode to the drain electrode, a source voltage can be lower than a drain voltage.

Also, the current in the n-channel transistor NMOS flows from the drain electrode to the source electrode and the source electrode can serve as an output terminal. In the situation of the p-channel transistor (PMOS), since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source electrode to the drain electrode and the drain electrode serves as an output terminal. Accordingly, the source electrode and the drain electrode can be changed in accordance with the applied voltage so that it should be noted that the source electrode and the drain electrode of the transistor are not fixed. In the present specification, it is assumed that the transistor is a n-channel transistor (NMOS), but is not limited thereto so that the p-channel transistor can be used and thus a circuit configuration can be changed.

Gate signals of transistors which are used as switching elements swing between a gate-on voltage and a gate-off voltage. The gate-on voltage is set to be higher than a threshold voltage Vth of the transistor and the gate-off voltage is set to be lower than the threshold voltage Vth of the transistor. The transistor is turned on in response to the gate-on voltage and is turned off in response to the gate-off voltage. In the situation of the NMOS, the gate-on voltage is a gate high voltage VGH and the gate-off voltage is a gate low voltage VGL. In the situation of the PMOS, the gate-on voltage is a gate low voltage VGL and the gate-off voltage is a gate high voltage VGH.

Hereinafter, various example embodiments of the present disclosure will be described in detail with reference to accompanying drawings.

FIG. 1 is a schematic view of a display device according to an example embodiment of the present disclosure.

Referring to FIG. 1, a display device 100 includes a display panel 110, a gate driver 120, a data driver 130, and a timing controller 140.

The display panel 110 is a panel for displaying images. The display panel 110 can include various circuits, wiring lines, and light emitting diodes disposed on the substrate. The display panel 110 is divided by a plurality of data lines DL and a plurality of gate lines GL intersecting each other and includes a plurality of pixels PX connected to the plurality of data lines DL and the plurality of gate lines GL. The display panel 110 includes a display area defined by a plurality of pixels PX and a non-display area in which various signal lines or pads are formed. The display panel 110 can be implemented by a display panel 110 used in various display devices such as a liquid crystal display device, an organic light emitting display device, or an electrophoretic display device. Hereinafter, it is described that the display panel 110 is a panel used in the organic light emitting display device, but is not limited thereto.

The timing controller 140 receives timing signals, such as a vertical synchronization signal, a horizontal synchronization signal, a data enable signal, or a dot clock, via a receiving circuit, such as an LVDS or TMDS interface connected to a host system. The timing controller 140 generates timing control signals based on the input timing signal to control the data driver 130 and the gate driver 120.

The data driver 130 supplies a data voltage DATA to the plurality of sub pixels SP. The data driver 130 includes a plurality of source drive ICs (integrated circuits). The plurality of source drive ICs can be supplied with digital video data and a source timing control signal from the timing controller 140. The plurality of source drive ICs converts digital video data into a gamma voltage in response to the source timing control signal to generate a data voltage DATA and supply the data voltage DATA through the data line DL of the display panel 110. The plurality of source drive ICs can be connected to the data line DL of the display panel 110 by a chip on glass (COG) process or a tape automated bonding (TAB) process. Further, the source drive ICs are formed on the display panel 110 or are formed on a separate PCB substrate to be connected to the display panel 110.

The gate driver 120 supplies a gate signal to the plurality of sub pixels SP. The gate driver 120 can include a level shifter and a shift register. The level shifter shifts a level of a clock signal input at a transistor-transistor-logic (TTL) level from the timing controller 140 and then supplies the clock signal to the shift register. The shift register can be formed in the non-display area of the display panel 110, by a GIP manner, but is not limited thereto. The shift register is configured by a plurality of stages which shifts the gate signal to output, in response to the clock signal and the driving signal. The plurality of stages included in the shift register sequentially outputs the gate signal through a plurality of output terminals.

The display panel 110 can include a plurality of sub pixels SP. The plurality of sub pixels SP can be sub pixels SP for emitting different color light. For example, the plurality of sub pixels SP can be a red sub pixel, a green sub pixel, a blue sub pixel, and a white sub pixel, but is not limited thereto. The plurality of sub pixels SP can configure a pixel PX. That is, the red sub pixel, the green sub pixel, the blue sub pixel, and the white sub pixel configure one pixel PX and the display panel 110 can include a plurality of pixels PX.

Hereinafter, a driving circuit for driving one sub pixel SP will be described in more detail with reference to FIG. 2 together.

Figure 2:
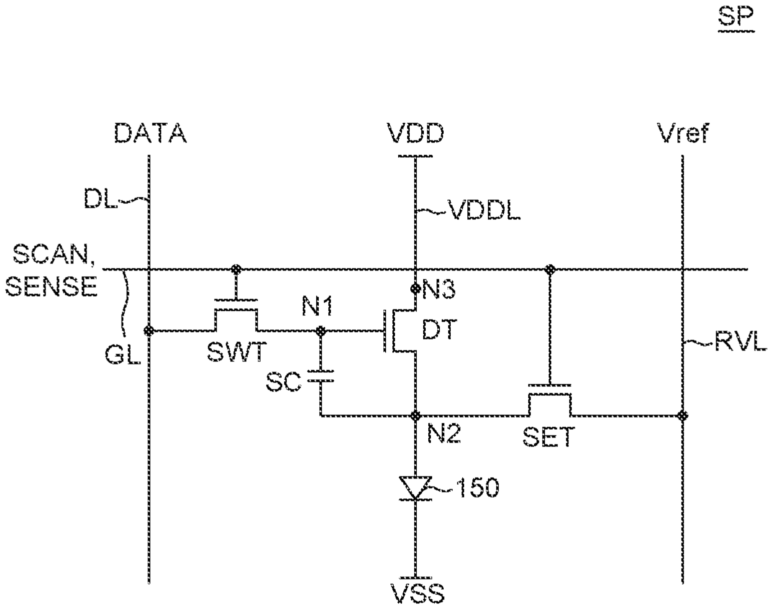
FIG. 2 is a circuit diagram of a sub pixel of a display device according to an example embodiment of the present disclosure.

FIG. 2 is a circuit diagram of a sub pixel of a display device according to an example embodiment of the present disclosure. In FIG. 2, a circuit diagram for one sub pixel SP among the plurality of sub pixels SP of the display device 100 is illustrated.

Referring to FIG. 2, the sub pixel SP can include a switching transistor SWT, a sensing transistor SET, a driving transistor DT, a storage capacitor SC, and a light emitting diode 150.

The light emitting diode 150 can include an anode, an organic layer, and a cathode. The organic layer can include various organic layers such as a hole injection layer, a hole transport layer, an organic light emitting layer, an electron transport layer, and an electron injection layer. The anode of the light emitting diode 150 can be connected to an output terminal of the driving transistor DT and a low potential voltage VSS is applied to the cathode. Even though in FIG. 2, it is described that the light emitting diode 150 is an organic light emitting diode 150, the present disclosure is not limited thereto so that as the light emitting diode 150, an inorganic light emitting diode, that is, an LED can also be used.

Referring to FIG. 2, the switching transistor SWT is a transistor which transmits the data voltage DATA to a first node N1 corresponding to a gate electrode of the driving transistor DT. The switching transistor SWT can include a drain electrode connected to the data line DL, a gate electrode connected to the gate line GL, and a source electrode connected to the gate electrode of the driving transistor DT. The switching transistor SWT is turned on by a scan signal SCAN applied from the gate line GL to transmit a data voltage DATA supplied from the data line DL to the first node N1 corresponding to the gate electrode of the driving transistor DT.

Referring to FIG. 2, the driving transistor DT is a transistor configured to supply a driving current to the light emitting diode 150 to drive the light emitting diode 150. The driving transistor DT can include a gate electrode corresponding to the first node N1, a source electrode corresponding to a second node N2 and an output terminal, and a drain electrode corresponding to a third node N3 and an input terminal. The gate electrode of the driving transistor DT is connected to the switching transistor SWT, the drain electrode is applied with a high potential voltage VDD via a high potential voltage line VDDL, and the source electrode is connected to the anode of the light emitting diode 150.

Referring to FIG. 2, a storage capacitor SC is a capacitor which maintains a voltage corresponding to the data voltage DATA for one frame. One electrode of the storage capacitor SC is connected to the first node N1 and the other electrode is connected to the second node N2.

In the meantime, in the situation of the display device 100, as the driving time of each sub pixel SP is increased, the circuit element such as the driving transistor DT can be degraded. Accordingly, a unique characteristic value of the circuit element such as a driving transistor DT can be changed (e.g., become degraded over time). Here, the unique characteristic value of the circuit element can include a threshold voltage Vth of the driving transistor DT or a mobility a of the driving transistor DT. The change in the characteristic value of the circuit element can cause a luminance change of the corresponding sub pixel SP. Accordingly, the change in the characteristic value of the circuit element can be used as the same concept as the luminance change of the sub pixel SP.

Further, the degree of the change in the characteristic values between circuit elements of each sub pixel SP can vary depending on a degree of degradation of each circuit element. Such a difference in the changed degree of the characteristic values between the circuit elements can cause a luminance deviation between the sub pixels SP. Accordingly, the characteristic value deviation between circuit elements can be used as the same concept as the luminance deviation between the sub pixels SP. The change in the characteristic values of the circuit elements, that is, the luminance change of the sub pixel SP and the characteristic value deviation between the circuit elements, that is, the luminance deviation between the sub pixels SP can cause problems, such as the lowering of the accuracy for luminance expressiveness of the sub pixel SP or screen abnormality.

Therefore, the sub pixel SP of the display device 100 according to the example embodiment of the present disclosure provides a sensing function of sensing a characteristic value for the sub pixel SP and a compensating function of compensating for the characteristic value of the sub pixel SP using the sensing result.

Therefore, as illustrated in FIG. 2, the sub pixel SP can further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL configured to supply a reference voltage Vref and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET can be utilized as one of voltage sensing paths for the source electrode of the driving transistor DT.

Referring to FIG. 2, the switching transistor SWT and the sensing transistor SET of the sub pixel SP can share one gate line GL. That is, the switching transistor SWT and the sensing transistor SET are connected to the same gate line GL to be applied with the same gate signal. However, for the convenience of description, a voltage which is applied to the gate electrode of the switching transistor SWT is referred to as a scan signal SCAN and a voltage which is applied to the gate electrode of the sensing transistor SET is referred to as a sensing signal SENSE. However, the scan signal SCAN and the sensing signal SENSE applied to one sub pixel SP are the same signal which is transmitted from the same gate line GL. Therefore, in FIG. 3, the scan signal SCAN and the sensing signal SENSE are defined as gate signals GATE1, GATE2, GATE3, and GATE4.

However, the present disclosure is not limited thereto so that only the switching transistor SWT is connected to the gate line GL and the sensing transistor SET can be connected to a separate sensing line. Therefore, the scan signal SCAN is applied to the switching transistor SWT through the gate line GL and the sensing signal SENSE is applied to the sensing transistor SET through the sensing line.

Accordingly, the reference voltage Vref is applied to the source electrode of the driving transistor DT via the sensing transistor SET. Further, a voltage for sensing the threshold voltage Vth of the driving transistor DT or the mobility a of the driving transistor DT is detected by the reference voltage line RVL. Further, the data driver 130 can compensate for the data voltage DATA in accordance with a variation of the threshold voltage Vth of the driving transistor DT or the mobility a of the driving transistor DT.

Hereinafter, a placement relationship of the plurality of sub pixels will be described with reference to FIG. 3.

Figure 3:
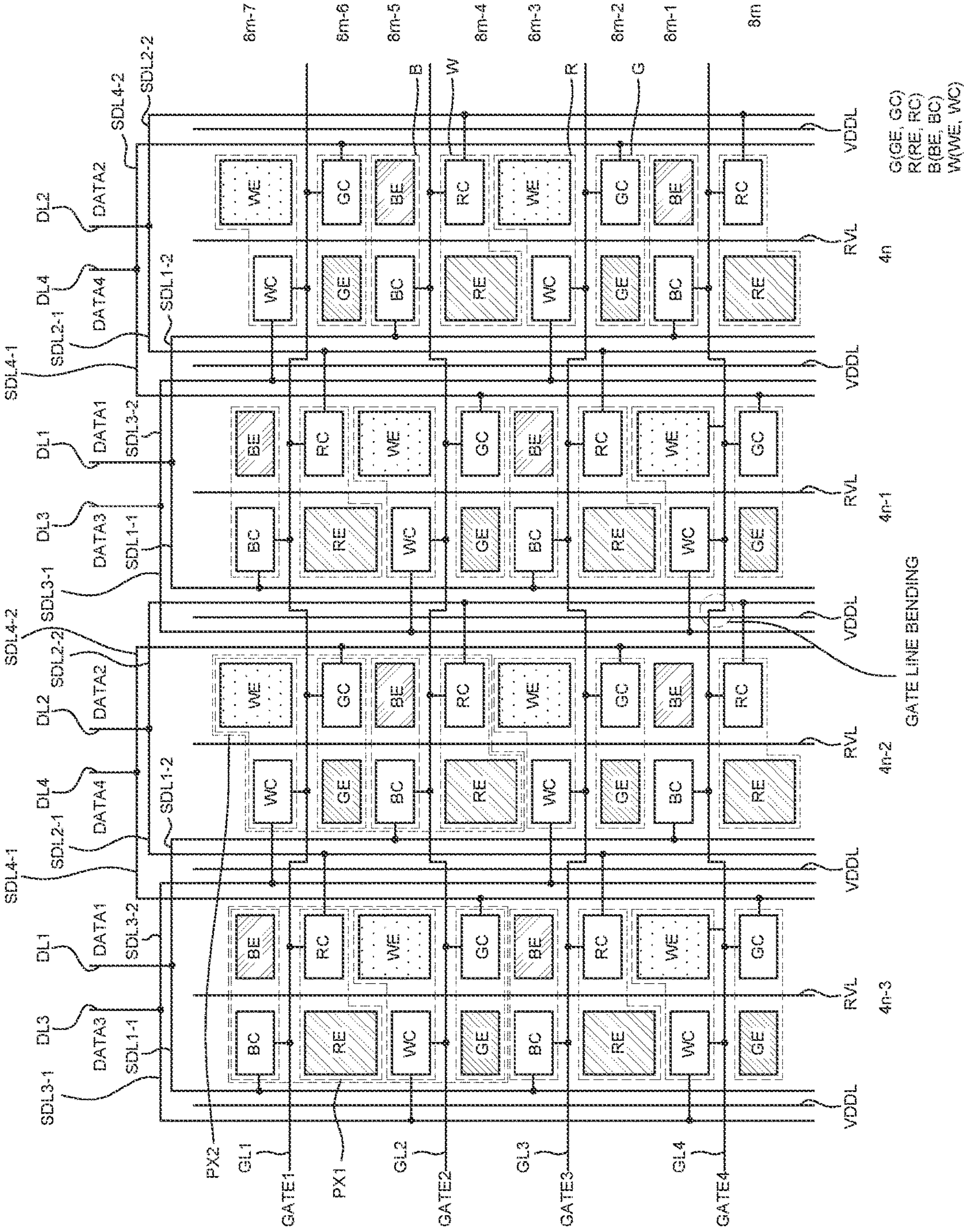
FIG. 3 is a block diagram for explaining a placement relationship of sub pixels of a display device according to an embodiment of the present disclosure.

FIG. 3 is a block diagram for explaining a placement relationship of sub pixels of a display device according to an example embodiment of the present disclosure.

For the convenience of description, in FIG. 3, only eight pixels which are disposed in a 4×2 matrix and in the display area, the arrangement of eight pixels disposed in a 4×2 matrix is repeated. Referring to FIG. 3, one pixel PX includes four sub pixels R, G, B, W. For example, as illustrated in FIG. 3, the pixel PX can include a first sub pixel B, a second sub pixel R, a third sub pixel W, and a fourth sub pixel G. Further, the first sub pixel B is a blue sub pixel, the second sub pixel R is a red sub pixel, the third sub pixel W is a white sub pixel, and the fourth sub pixel G is a green sub pixel. However, the present disclosure is not limited thereto and the plurality of sub pixels can be changed to various colors, such as magenta, yellow, and cyan.

The first sub pixel B, the second sub pixel R, the third sub pixel W, and the fourth sub pixel G are sequentially disposed in the same column.

Specifically, the arrangement order of the first sub pixel B, the second sub pixel R, the third sub pixel W, and the fourth sub pixel G disposed in the odd-numbered column (e.g., a 4n-3rd column and a 4n-1st column) can be different from the arrangement order of the first sub pixel B, the second sub pixel R, the third sub pixel W, and the fourth sub pixel G disposed in the even-numbered column (e.g., a 4n-2nd column and a 4n-th column).

That is, in the odd-numbered column (e.g., the 4n-3rd column and the 4n-1st column), the first sub pixel B, the second sub pixel R, the third sub pixel W, and the fourth sub pixel G are disposed, in this order to configure the first pixel PX1 (e.g., see the large dotted rectangle area for PX1 in FIG. 3).

That is, in the even-numbered column (e.g., the 4n-2nd column and the 4n-th column), the third sub pixel W, the fourth sub pixel G, the first sub pixel B, and the second sub pixel R are disposed in this order to configure the second pixel PX2 (e.g., see the large dotted rectangle area for PX2 in FIG. 3).

To be more specific, as illustrated in FIG. 3, in the odd-numbered column (e.g., the 4n-3rd column and the 4n-1st column), the first sub pixel B is disposed in an 8m-7th row and a 8m-3rd row and in the even-numbered column (e.g., the 4n-2nd column and the 4n-th column), the first sub pixel B is disposed in a 8m-5th row and the 8m-1st row. In the odd-numbered column (e.g., the 4n-3rd column and the 4n-1st column), the second sub pixel R is disposed in an 8m-6th row and a 8m-2nd row and in the even-numbered column (e.g., the 4n-2nd column and the 4n-th column), the second sub pixel R is disposed in a 8m-4th row and the 8m-th row. In the odd-numbered column (e.g., the 4n-3rd column and the 4n-1st column), the third sub pixel W is disposed in an 8m-5th row and an 8m-1st row and in the even-numbered column (e.g., the 4n-2nd column and the 4n-th column), the third sub pixel W is disposed in an 8m-7th row and the 8m-3rd row. In the odd-numbered column (e.g., the 4n-3rd column and the 4n-1st column), the fourth sub pixel G is disposed in an 8m-4th row and an 8m-th row and in the even-numbered column (e.g., the 4n-2nd column and the 4n-th column), the fourth sub pixel G is disposed in a 8m-6th row and the 8m-2nd row. Here, m and n are natural numbers greater than or equal to 1.

However, it is not limited thereto so that the arrangement orders of the second sub pixel R and the third sub pixel W of the first pixel PX1 can be switched and the arrangement orders of the first sub pixel B and the fourth sub pixel G of the first pixel PX1 can be switched. Further, the arrangement orders of the second sub pixel R and the third sub pixel W of the second pixel PX2 can be switched and the arrangement orders of the first sub pixel B and the fourth sub pixel G of the second pixel PX2 can be switched.

The first sub pixel B includes a first light emitting diode BE and a first circuit element BC and the second sub pixel R includes a second light emitting diode RE and a second circuit element RC. The third sub pixel W includes a third light emitting diode WE and a third circuit element WC and the fourth sub pixel G includes a fourth light emitting diode GE and a fourth circuit element GC.

The first circuit element BC, the second circuit element RC, the third circuit element WC, and the fourth circuit element GC are disposed in a diagonal direction with respect to sub data lines SDL1-1, SDL1-2, SDL2-1, SDL2-2, SDL3-1, SDL3-2, SDL4-1, SDL4-2. The first light emitting diode BE, the second light emitting diode RE, the third light emitting diode WE, and the fourth light emitting diode GE are disposed in a diagonal direction with respect to sub data lines SDL1-1, SDL1-2, SDL2-1, SDL2-2, SDL3-1, SDL3-2, SDL4-1, SDL4-2. In other words, the various light emitting diodes and corresponding circuit elements can be arranged in alternating zig-zag patterns, but is not limited thereto.

That is, the first circuit element BC, the second circuit element RC, the third circuit element WC, and the fourth circuit element GC are disposed in a vertical direction and a horizontal direction with respect to the first light emitting diode BE, the second light emitting diode RE, the third light emitting diode WE, and the fourth light emitting diode GE. However, the first light emitting diode BE, the second light emitting diode RE, the third light emitting diode WE, and the fourth light emitting diode GE are not disposed to be adjacent to each other in the vertical direction and the horizontal direction.

Each of the plurality of data lines DL1, DL2, DL3, DL4 can be divided into the plurality of sub data lines SDL1-1, SDL1-2, SDL2-1, SDL2-2, SDL3-1, SDL3-2, SDL4-1, and SDL4-2. For example, each data line can branch into a pair of two sub data lines to run along opposite sides of one pixel unit including four sub pixels, providing an efficient wiring layout for supplying the corresponding data signal to each of the light emitting diodes arranged in the alternating zig-zag pattern.

That is, the first data line DL1 is divided into a 1-1st sub data line SDL1-1 and a 1-2nd sub data line SDL1-2. The second data line DL2 is divided into a 2-1st sub data line SDL2-1 and a 2-2nd sub data line SDL2-2. The third data line DL3 is divided into a 3-1st sub data line SDL3-1 and a 3-2nd sub data line SDL3-2. The fourth data line DL4 is divided into a 4-1st sub data line SDL4-1 and a 4-2nd sub data line SDL4-2.

The plurality of sub data lines SDL1-1, SDL1-2, SDL2-1, SDL2-2, SDL3-1, SDL3-2, SDL4-1, and SDL4-2 are disposed on both sides of the plurality of sub pixels R, G, B, W disposed in one column to be connected to the plurality of sub pixels R, G, B, W.

In other words, the 1-1st sub data line SDL1-1 and the 3-1st sub data line SDL3-1 are disposed on one side of the plurality of sub pixels R, G, B, W disposed in the odd-numbered column (e.g., the 4n-3rd column and the 4n-1st column). The 1-2nd sub data line SDL1-2 and the 3-2nd sub data line SDL3-2 are disposed on the other side of the plurality of sub pixels R, G, B, W disposed in the odd-numbered column (e.g., the 4n-3rd column and the 4n-1st column). The 2-1st sub data line SDL2-1 and the 4-1st sub data line SDL4-1 are disposed on one side of the plurality of sub pixels R, G, B, W disposed in the even-numbered column (e.g., the 4n-2nd column and the 4n-th column). The 2-2nd sub data line SDL2-2 and the 4-2nd sub data line SDL4-2 are disposed on the other side of the plurality of sub pixels R, G, B, W disposed in the even-numbered column (e.g., the 4n-2nd column and the 4n-th column).

For example, the 1-1st sub data line SDL1-1 and the 3-1st sub data line SDL3-1 are disposed at the left side of the plurality of sub pixels R, G, B, W disposed in the odd-numbered column (e.g., the 4n-3rd column) to be connected to the plurality of first sub pixels B and the plurality of third sub pixels W disposed in the odd-numbered column (e.g., 4n-3rd column). Further, the 1-2nd sub data line SDL1-2 and the 3-2nd sub data line SDL3-2 are disposed at the right side of the plurality of sub pixels R, G, B, W disposed in the odd-numbered column (e.g., the 4n-3rd column) to be connected to the plurality of first sub pixels B and the plurality of third sub pixels W disposed in the even-numbered column (e.g., 4n-2nd column).

The 2-1st sub data line SDL2-1 and the 4-1st sub data line SDL4-1 are disposed at the left side of the plurality of sub pixels R, G, B, W disposed in the even-numbered column (e.g., the 4n-2nd column) to be connected to the plurality of second sub pixels R and the plurality of fourth sub pixels G disposed in the odd-numbered column (e.g., 4n-3rd column). Further, the 2-2nd sub data line SDL2-2 and the 4-2nd sub data line SDL4-2 are disposed at the right side of the plurality of sub pixels R, G, B, W disposed in the even-numbered column (e.g., the 4n-2nd column) to be connected to the plurality of second sub pixels R and the plurality of fourth sub pixels G disposed in the even-numbered column (e.g., 4n-2nd column).

A first data voltage DATA1 which is a blue data voltage is applied to the first data line DL1 and a second data voltage DATA2 which is a red data voltage is applied to the second data line DL2. Further, a third data voltage DATA3 which is a white data voltage is applied to the third data line DL3 and a fourth data voltage DATA4 which is a green data voltage is applied to the fourth data line DL4.

Therefore, the first data voltage DATA1 which is a blue data voltage is applied to the 1-1st data line SDL1-1 and the 1-2nd data line SDL1-2. The second data voltage DATA2 which is a red data voltage is applied to the 2-1st data line SDL2-1 and the 2-2nd data line SDL2-2. The third data voltage DATA3 which is a white data voltage is applied to the 3-1st data line SDL3-1 and the 3-2nd data line SDL3-2. The fourth data voltage DATA4 which is a green data voltage is applied to the 4-1st data line SDL4-1 and the 4-2nd data line SDL4-2.

Also, a plurality of dummy lines can be further disposed at the left side of the plurality of sub pixels R, W, B, G disposed in the 4n-3rd column. The plurality of dummy lines described above can be disposed on both sides of the high potential voltage line VDDL disposed at the left side of the plurality of sub pixels R, W, B, G disposed in the 4-3rd column.

Alternately, the plurality of dummy lines can be further disposed at the right side of the plurality of the sub pixels R, W, B, G disposed in the 4n-th column. The plurality of dummy lines described above can be disposed on both sides of the high potential voltage line VDDL disposed at the right side of the plurality of sub pixels R, W, B, G disposed in the 4n -th column.

The plurality of dummy lines described above can be disposed on the same layer as the plurality of sub data lines SDL1-1, SDL1-2, SDL2-1, SDL2-2, SDL3-1, SDL3-2, SDL4-1, and SDL4-2.

Each of the plurality of high potential voltage lines VDDL can be disposed between the plurality of adjacent sub data lines SDL1-1, SDL1-2, SDL2-1, SDL2-2, SDL3-1, SDL3-2, SDL4-1, and SDL4-2.

In other words, the high potential voltage line VDDL is disposed between the plurality of sub pixels R, W, B, G disposed in the odd-numbered column (e.g., the 4n-3rd column and the 4n-1st column) and the plurality of sub pixels R, W, B, G disposed in the even-numbered column (e.g., the 4n-4th column and the 4n-th column).

Therefore, at least one of the plurality of adjacent sub data lines SDL1-1, SDL1-2, SDL2-1, SDL2-2, SDL3-1, SDL3-2, SDL4-1, and SDL4-2 can overlap the high potential voltage line VDDL. For example, in FIG. 3, the 3-1st sub data line SDL3-1 overlaps the high potential voltage line VDDL to be connected to the third sub pixel W.

Each of the plurality of reference voltage lines RVL can be disposed in each of the plurality of sub pixels R, G, B, W.

Specifically, each of the plurality of reference lines RVL is disposed between the first light emitting diode BE and the first circuit element BC, between the second light emitting diode RE and the second circuit element RC, between the third light emitting diode WE and the third circuit element WC, and between the fourth light emitting diode GE and the fourth circuit element GC. For example, each of the reference lines RVL can be disposed down the center of a corresponding pixel unit, such as running along the center the alternating zig-zag pattern including the light emitting diodes and the circuit elements, and dividing it in half (e.g., see FIG. 3).

Any one of the plurality of reference voltage lines RVL is connected to the plurality of sub pixels R, G, B, W disposed in the odd-numbered column (e.g., the 4n-3rd column and the 4n-1st column). The other one of the plurality of reference voltage lines RVL is connected to the plurality of sub pixels R, G, B, W disposed in the even-numbered column (e.g., the 4n-2nd column and the 4n-th column).

The first circuit element BC and the third circuit element WC are disposed to be opposite to the second circuit element RC and the fourth circuit element GC with respect to each of the plurality of reference voltage lines RVL.

That is, the first circuit element BC and the third circuit element WC are disposed at the left side of the reference voltage line RVL and the second circuit element RC and the fourth circuit element GC are disposed at the right side of the reference voltage line RVL, with respect to the plurality of sub pixels R, G, B, W disposed in the odd-numbered column (e.g., the 4n-3rd column and the 4n-1st column).

Further, the first circuit element BC and the third circuit element WC are disposed at the left side of the reference voltage line RVL and the second circuit element RC and the fourth circuit element GC are disposed at the right side of the reference voltage line RVL, with respect to the plurality of sub pixels R, G, B, W disposed in the even-numbered column (e.g., the 4n-2nd column and the 4n-th column).

The first light emitting diode BE and the third light emitting diode WE are disposed to be opposite to the second light emitting diode RE and the fourth light emitting diode GE with respect to each of the plurality of reference voltage lines RVL.

The plurality of gate lines GL1 to GL4 can be disposed in the plurality of sub pixels R, W, B, G. That is, the plurality of gate lines GL1 to GL4 are disposed between the first sub pixel B and the second sub pixel R or between the third sub pixel W and the fourth sub pixel G.

Specifically, the odd-numbered gate lines GL1 and GL3 are disposed between the first sub pixel B and the second sub pixel R in in the odd-numbered column (e.g., the 4n-3rd column and the 4n-1st column) and are disposed between the third sub pixel W and the fourth sub pixel G in the even-numbered column (e.g., the 4n-2nd column and the 4n-th column). For example, the gate lines can weave in between different sub pixels within each sub pixel unit in an alternating manner based on whether the pixel unit is in an odd-numbered column or an even-numbered column (e.g., the arrangement of sub pixels in an odd-numbered column can be shifted down slightly relative to the arrangement of sub pixels in an even-numbered column, and gate lines can intersect through the shifted arrangements of sub pixels, see FIG. 3).

That is, one odd-numbered gate line GL1 and GL3 can be disposed between the plurality of sub pixels R, W, G, B with respect to one pixel PX1, PX2. For example, the first gate line GL1 is disposed between the first sub pixel B of the first pixel PX1 and the third sub pixel W of the second pixel PX2 disposed in the 8m-7th row and the second sub pixel R of the first pixel PX1 and the fourth sub pixel G of the second pixel PX2 disposed in the 8m-6th row. Further, the first gate line GL1 is connected to the first sub pixel B and the second sub pixel R of the first pixel PX1 and the third sub pixel W and the fourth sub pixel G of the second pixel PX2.

The even-numbered gate lines GL2 and GL4 can be disposed between the third sub pixel W and the fourth sub pixel G in the odd-numbered column (e.g., the 4n-3rd column and the 4n-1st column) and disposed between the first sub pixel B and the second sub pixel in the even-numbered column (e.g., the 4n-2nd column and the 4n-th column).

That is, one even-numbered gate line GL2 can be disposed between the plurality of sub pixels R, W, G, B with respect to one pixel PX1, PX2. For example, the second gate line GL2 is disposed between the first sub pixel B of the second pixel PX2 and the third sub pixel W of the first pixel PX1 disposed in the 8m-5th row and the second sub pixel R of the second pixel PX2 and the fourth sub pixel G of the first pixel PX1 disposed in the 8m-4th row. Further, the second gate line GL2 is connected to the third sub pixel W and the fourth sub pixel G of the first pixel PX1 and the first sub pixel B and the second sub pixel R of the second pixel PX2.

In the meantime, each of the plurality of gate lines GL1 to GL4 can be bent at a portion passing into the plurality of sub pixels R, W, B, G disposed in the adjacent columns, in the plurality of sub pixels R, W, B, G disposed in one column.

That is, each of the plurality of gate lines GL1 to GL4 can be bent between the plurality of sub pixels R, W, B, G disposed to adjacent columns (e.g., see GATE LINE BENDING in FIG. 3).

For example, the odd-numbered gate lines GL1 and GL3 are downwardly bent when passing from the plurality of first pixels PX1 to the plurality of second pixels PX2. The odd-numbered gate lines GL1 and GL3 are upwardly bent when passing from the plurality of second pixels PX2 to the plurality of first pixels PX1.

The even-numbered gate lines GL2 and GL4 are upwardly bent when passing from the plurality of first pixels PX1 to the plurality of second pixel PX2. The even-numbered gate lines GL2 and GL4 are downwardly bent when passing from the plurality of second pixels PX2 to the plurality of first pixels PX1.

The display device according to the example embodiment of the present disclosure is designed such that the second light emitting diode RE of the second sub pixel R and the third light emitting diode WE of the third sub pixel W which emit a relatively large amount of light are relatively large (e.g., the areas of RE and WE are larger than the areas of BE and GE). Therefore, an intensity of the current applied to the second light emitting diode RE of the second sub pixel R and the third light emitting diode WE of the third sub pixel W is reduced so that the degradation of the second sub pixel R and the third sub pixel W can be minimized.

Therefore, the sizes of the second sub pixel R and the third sub pixel W can be larger than the sizes of the first sub pixel B and the fourth sub pixel G. Accordingly, each of the plurality of gate lines GL1 to GL4 can be bent when passing from the plurality of first pixels PX1 to the plurality of second pixels PX2 or passing from the plurality of first pixels PX1 to the plurality of second pixels PX2.

In the meantime, each of the plurality of gate lines GL1 to GL4 can be configured as a double layer including a first electrode layer and a second electrode layer.

The first electrode layer can be the same electrode layer as the gate electrode of the plurality of transistors and the second electrode layer can be the same electrode layer as the source electrode and the drain electrode of the plurality of transistors.

Further, the second electrode can be the same electrode layer as the light shielding layer disposed below the source and drain electrodes of the plurality of transistors. However, the interlayer structure of the second electrode is not limited thereto, but can be configured by a metal layer disposed on a layer other than the gate electrodes of the plurality of transistors.

The plurality of transistors described above refers to at least one of the switching transistor SWT, the driving transistor DT, and the sensing transistor SET illustrated in FIG. 2.

In the meantime, on the plan view, the second electrode layer can be disposed between the plurality of sub pixels R, W, B, G. To be more specific, the second electrode layer can be the same electrode layer as the source electrode and the drain electrode of the plurality of transistors. Therefore, the second electrode layer may not be formed in an area where the plurality of gate lines GL1 to GL4 and the plurality of sub data lines SDL1-1, SDL1-2, SDL2-1, SDL2-2, SDL3-1, SDL3-2, SDL4-1, SDL4-2 intersect.

Therefore, the second electrode layer can be formed only in an area where the plurality of gate lines GL1 to GL4 and the plurality of sub data lines SDL1-1, SDL1-2, SDL2-1, SDL2-2, SDL3-1, SDL3-2, SDL4-1, SDL4-2 do not intersect, but the arrangement structure of the second electrode layer can vary in various forms.

That is, each of the plurality of gate lines GL1 to GL4 can be formed as a double layered line configured by a first electrode layer and a second electrode layer. Accordingly, the linear resistance of the plurality of gate lines GL1 to GL4 can be reduced. For example, each of the plurality of gate lines GL1 to GL4 is formed as a double layered line so that the linear resistance can be reduced as compared with the single layered wiring line. Therefore, a total resistance of the gate line is reduced so that the RC delay of the gate voltage can be reduced. Consequently, a charging rate of the gate voltage can be increased.

Figure 4:
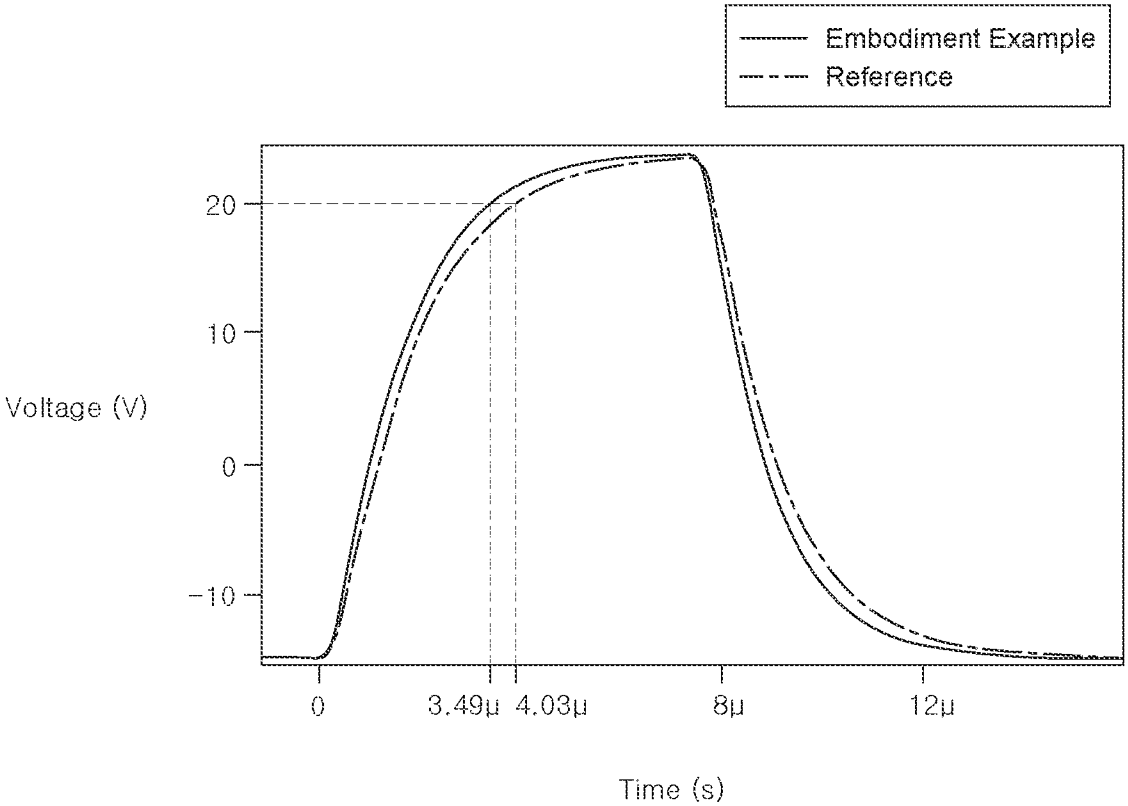
FIG. 4 is a waveform of a gate voltage of a display device according to an embodiment example of the present disclosure compared with a reference example.

FIG. 4 is a waveform of a gate voltage of a display device according to an example embodiment of the present disclosure.

In the display device of the related art, the gate line is formed by a single layered line so that the charging speed of the gate voltage can be relatively low. As illustrated in FIG. 4, in the display device of the related art, a rising time of the gate voltage when the gate voltage reached 20 V was measured as 4.03 μs.

In contrast, in the display device according to the example embodiment of the present disclosure, the wiring line is formed as a double layered line so that the charging speed of the gate voltage can be relatively low. As illustrated in FIG. 4, in the display device of according to the example embodiment of the present disclosure, a rising time of the gate voltage when the gate voltage reached 20 V was measured as 3.49 μs.

That is, the gate voltage rising time of the display device of according to the example embodiment of the present disclosure is reduced so that the gate voltage can be more rapidly charged.

Hereinafter, a driving method of a display device according to an example embodiment of the present disclosure will be described with reference to FIGS. 5 to 7.

Figure 5:
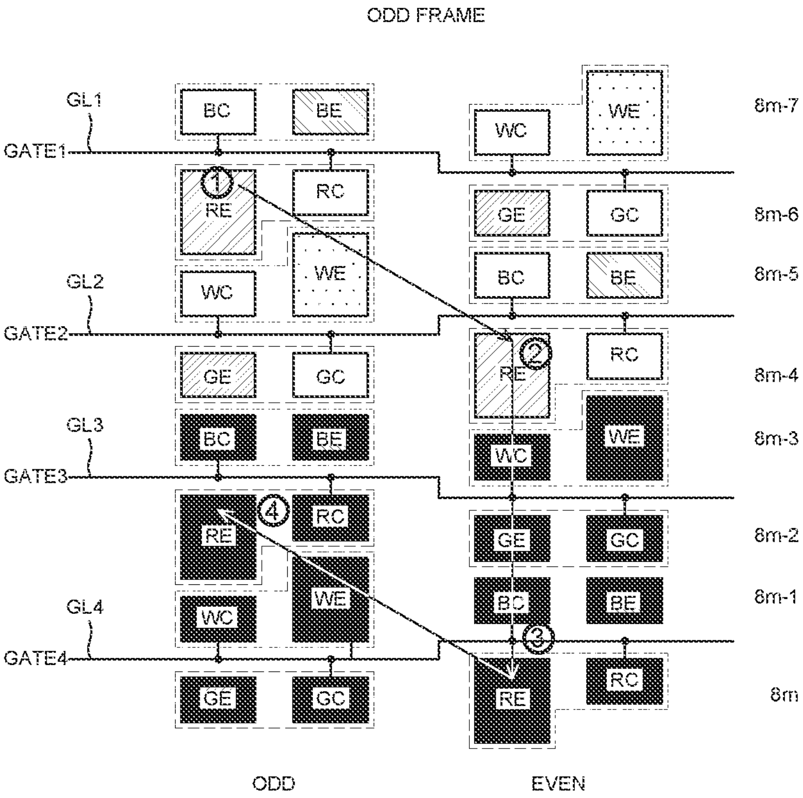
FIG. 5 is a view for explaining a driving order in an odd-numbered frame of a display device according to an embodiment of the present disclosure.

FIG. 5 is a view for explaining a driving order in an odd-numbered frame of a display device according to an example embodiment of the present disclosure.

Figure 6:
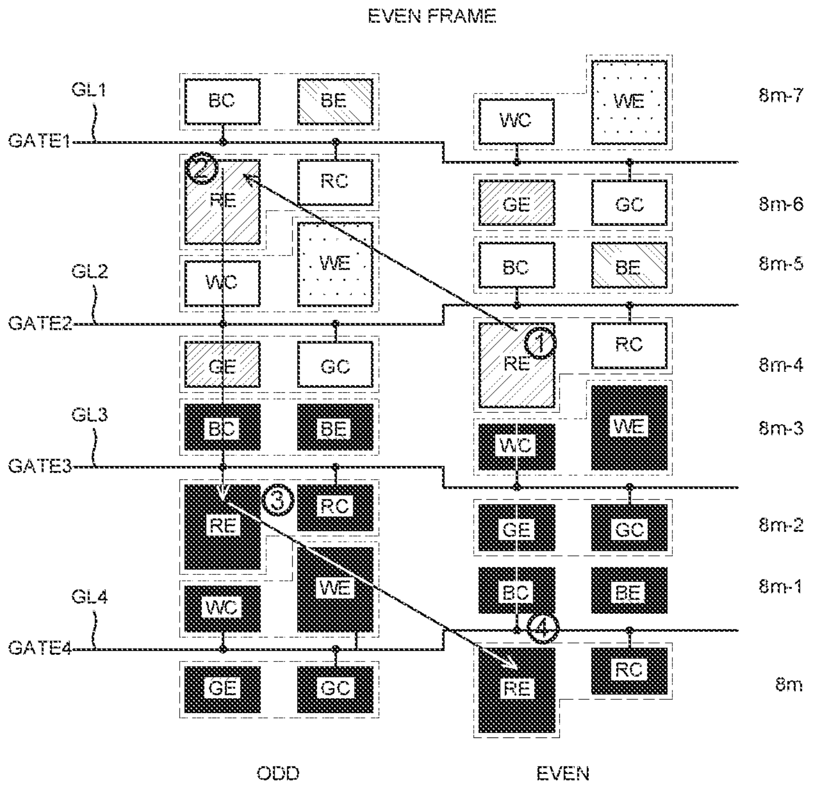
FIG. 6 is a view for explaining a driving order in an even-numbered frame of a display device according to an embodiment of the present disclosure.

FIG. 6 is a view for explaining a driving order in an even-numbered frame of a display device according to an example embodiment of the present disclosure.

Figure 7:
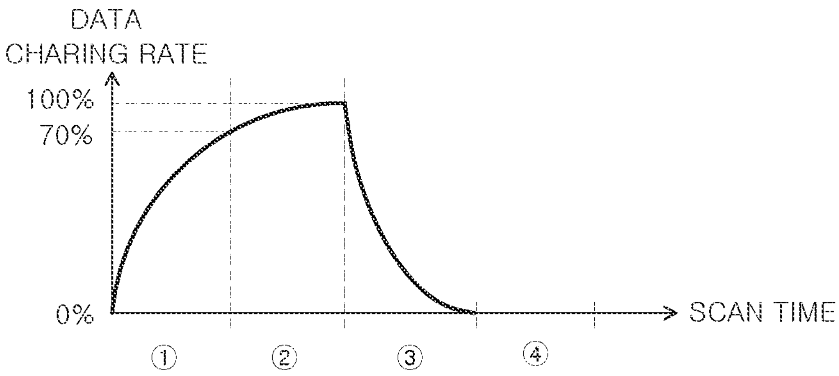
FIG. 7 is a view for explaining a charging rate of a data voltage of a display device according to an embodiment of the present disclosure.

FIG. 7 is a view for explaining a charging rate of a data voltage of a display device according to an example embodiment of the present disclosure.

Also, a data line, a reference voltage line, and a high potential voltage line which are vertically disposed, the placement relationship of the data line, the reference voltage line, and the high potential voltage line is the same as described in FIG. 3.

As illustrated in FIGS. 5 and 6, it is described that a horizontal stripe pattern in which a plurality of sub pixels R, G, B, W disposed in an 8m-7th row and a 8m-4th row emit light and a plurality of sub pixels R, G, B, W disposed in a 8m-3rd row and a 8m-th row do not emit light is displayed.

Hereinafter, even though a data charging rate of the plurality of second sub pixels R will be described in detail, a data charging rate of the plurality of first sub pixels B, a data charging rate of the plurality of third sub pixels W, and a data charging rate of the plurality of fourth sub pixels G will be described with the same principle as the data charging rate of the plurality of second sub pixels R.

As illustrated in FIG. 7, when the horizontal stripe pattern is displayed, a charging rate of the third data voltage DATA3 can increase during a first horizontal period (1) and a second horizontal period (3) and a charging rate of the third data voltage DATA3 can be lowered during a third horizontal period (3) and a fourth horizontal period (4). A charging rate waveform of the third data voltage DATA3 can be repeated.

In FIGS. 5 and 6, a turn-on order of the plurality of gate lines GL1, GL2, GL3, Gl4 in an odd-numbered frame can be different from a turn-on order of the plurality of gate lines GL1, GL2, GL3, GL4 in an even-numbered frame.

Specifically, the first gate line GL1, the second gate line GL2, the fourth gate line GL4, and the third gate line GL3 are turned on in turns in the odd-numbered frame and the second gate line GL2, the first gate line GL1, the third gate line GL3, and the fourth gate line GL4 are turned on in turns in the even-numbered frame.

In the meantime, the turn-on order of the plurality of gate lines GL1, GL2, GL3, Gl4 in an odd-numbered frame can be switched to a turn-on order of the plurality of gate lines GL1, GL2, GL3, GL4 in an even-numbered frame.

For example, referring to FIG. 5, during the odd-numbered frame, in the first horizontal period (1), the first gate voltage GATE1 is applied to the first gate line GL1 at a turn-on level to charge the second sub pixel R disposed in the 8m-6th row with the data voltage.

During the odd-numbered frame, in the second horizontal period (2), the second gate voltage GATE2 is applied to the second gate line GL2 at a turn-on level to charge the second sub pixel R disposed in the 8m-4th row with the data voltage.

During the odd-numbered frame, in the third horizontal period (3), the fourth gate voltage GATE4 is applied to the fourth gate line GL4 at a turn-on level to charge the second sub pixel R disposed in the 8m-th row with the data voltage.

During the odd-numbered frame, in the fourth horizontal period (4), the third gate voltage GATE3 is applied to the third gate line GL3 at a turn-on level to charge the second sub pixel R disposed in the 8m-2nd row with the data voltage.

In other words, with reference to FIGS. 5 and 6, each specific color subpixel (e.g., see red RE for instance) within four adjacent pixel units (e.g., each pixel unit including four sub pixels) can be arranged in a quadrilateral shape, such as a parallelogram, and the quadrilateral arrangement of sub pixels among four different pixel units having the same color can be driven in an alternating manner for even frames and odd frames. For example, the quadrilateral arrangement of sub pixels having the same color can be driven in a clockwise emitting sequence during even frames and can be driven in a counter-clockwise emitting sequence during odd frames. Also, the alternating clockwise/counter-clockwise emitting sequences for the four subpixels can always be initiated at a same sub pixel, or can be initiated at a different sub pixel in an alternating manner based on whether it is an odd frame or an even frame (e.g., in FIG. 5 the top-left red sub pixel RE starts emitting first during the odd frame, while in in FIG. 6 the top-right red sub pixel RE starts emitting first during the even frame). Also, a different sub pixel among the quadrilateral arrangement of sub pixels can be selected as the starting sub each time or randomly selected for each subsequent frame. In this way, the embodied invention can improve brightness uniformity among pixels units that are close to each other, even when displaying very specific or difficult patterns, such horizontal stripes or a checker board image.

Referring to FIG. 6, during the even-numbered frame, in the first horizontal period (1), the second gate voltage GATE2 is applied to the second gate line GL2 at a turn-on level to charge the second sub pixel R disposed in the 8m-4th row with the data voltage.

During the even-numbered frame, in the second horizontal period (2), the first gate voltage GATE1 is applied to the first gate line GL1 at a turn-on level to charge the second sub pixel R disposed in the 8m-6th row with the data voltage.

During the even-numbered frame, in the third horizontal period (3), the third gate voltage GATE3 is applied to the third gate line GL3 at a turn-on level to charge the second sub pixel R disposed in the 8m-2nd row with the data voltage.

During the even-numbered frame, in the fourth horizontal period (4), the fourth gate voltage GATE4 is applied to the fourth gate line GL4 at a turn-on level to charge the second sub pixel R disposed in the 8m-th row with the data voltage.

As described above, when the vertical stripe pattern is implemented, a data charging rate of the plurality of second sub pixels R will be described below, with reference to FIGS. 7, additionally.

During the odd-numbered frame, in the first horizontal period (1) at which the charging of the data voltage starts, a data charging rate of the second sub pixel R disposed in the 8m-6th row can be 70% (e.g., weak charging).

During the odd-numbered frame, in the second horizontal period (2) in which the charging of the data voltage ends, a charging rate of the second sub pixel R disposed in the 8m-4th row can be 100% (e.g., strong charging).

During the odd-numbered frame, in the third horizontal period (3) and the fourth horizontal period (4) in which the data voltage is discharged, charging rates of the second sub pixel R disposed in the 8m-2nd row and the second sub pixel R disposed in the 8m-th row can be 0%.

During the even-numbered frame, in the first horizontal period (1) at which the charging of the data voltage starts, a data charging rate of the second sub pixel R disposed in the 8m-4th row can be 70% (e.g., weak charging).

During the even-numbered frame, in the second horizontal period (2) in which the charging of the data voltage ends, a charging rate of the second sub pixel R disposed in the 8m-6th row can be 100% (e.g., strong charging).

During the even-numbered frame, in the third horizontal period (3) and the fourth horizontal period (4) in which the data voltage is discharged, charging rates of the second sub pixel R disposed in the 8m-th row and the second sub pixel R disposed in the 8-2nd row can be 0%.

In summary, the data charging rate of the second sub pixel R disposed in the 8m-4th row is 100% (e.g., strong charging) during the odd-numbered frame and is 70% (e.g., weak charging) during the even-numbered frame. Therefore, an average of the data charging rates of the second sub pixels R disposed in the 8m-4th row can be 85%.

The data charging rate of the second sub pixel R disposed in the 8m-6th row is 100% (e.g., strong charging) during the even-numbered frame and is 70% (e.g., weak charging) during the odd-numbered frame. Therefore, an average of the data charging rates of the second sub pixels R disposed in the 8m-6th row can be 85%.

Accordingly, the display device according to an example embodiment of the present disclosure sets a different gate-turn on order for every frame to set an average value of the data charging rate of the sub pixel which emits light from the vertical stripe pattern to be the same.

Accordingly, in the display device according to an example embodiment of the present disclosure, a line defect is not generated even in the specific pattern and a pattern can be accurately implemented. For example, even when displaying difficult patterns, such as horizontal stripes or a checker board pattern, a line defect can be prevented and the viewer can experience high image quality and fidelity. As a result, an image quality of the display device according to another example embodiment of the present disclosure can be improved.

The example embodiments of the present disclosure can also be described as follows:

According to an aspect of the present disclosure, a display device includes a display panel in which a plurality of pixels including a plurality of sub pixels having different colors is disposed; a data driver configured to supply a data voltage to the plurality of pixels via a plurality of data lines; and a gate driver configured to supply a gate signal to the plurality of pixels via a plurality of gate lines, in which the plurality of sub pixels is sequentially disposed in the same column, each of the plurality of data lines is divided into a plurality of sub data lines and each of the plurality of sub data lines is disposed on both sides of the plurality of sub pixels which is sequentially disposed in the same column.

An arrangement order of the plurality of sub pixels disposed in an odd-numbered column can be different from an arrangement order of the plurality of sub pixels disposed in an even-number column.

The plurality of sub pixels can include a first sub pixel, a second sub pixel, a third sub pixel, and a fourth sub pixel which can be sequentially disposed, the first sub pixel can include a first light emitting diode and a first circuit element, the second sub pixel can include a second light emitting diode and a second circuit element, the third sub pixel can include a third light emitting diode and a third circuit element, and the fourth sub pixel can include a fourth light emitting diode and a fourth circuit element.

The display device can further comprise a plurality of reference voltage lines which senses the plurality of pixels and each of the plurality of reference voltage lines can be disposed between the first light emitting diode and the first circuit element, between the second light emitting diode and the second circuit element, between the third light emitting diode and the third circuit element, and between the fourth light emitting diode and the fourth circuit element.

For each of the plurality of sub pixels, the first circuit element and the third circuit element can be disposed to be opposite to the second circuit element and the fourth circuit element with respect to the plurality of reference voltage lines.

Each of the plurality of data lines can include a first data line configured to supply a first data voltage, a second data line configured to supply a second data voltage, a third data line configured to supply a third data voltage, and a fourth data line configured to supply a fourth data voltage, the first data line can be divided into a 1-1st sub data line and a 1-2nd sub data line, the second data line can be divided into a 2-1st sub data line and a 2-2nd sub data line, the third data line can be divided into a 3-1st sub data line and a 3-2nd sub data line, and the fourth data line can be divided into a 4-1st sub data line and a 4-2nd sub data line.

The 1-1st sub data line can be disposed on one side of the plurality of sub pixels disposed in an odd-numbered column, the 1-2nd sub data line can be disposed on the other side of the plurality of sub pixels disposed in the odd-numbered column, the 2-1st sub data line can be disposed on one side of the plurality of sub pixels disposed in an even-numbered column, the 2-2nd sub data line can be disposed on the other side of the plurality of sub pixels disposed in the even-numbered column, the 3-1st sub data line can be disposed on one side of the plurality of sub pixels disposed in an odd-numbered column, the 3-2nd sub data line can be disposed on the other side of the plurality of sub pixels disposed in an odd-numbered column, the 4-1st sub data line can be disposed on one side of the plurality of sub pixels disposed in an even-numbered column, and the 4-2nd sub data line can be disposed on the other side of the plurality of sub pixels disposed in the even-numbered column.

A high potential voltage line can be disposed between at least one of the 1-2nd sub data line and the 3-2nd sub data line and at least one of the 2-1st sub data line and the 4-1st sub data line and a high potential voltage line can be disposed between at least one of the 1-1st sub data line and the 3-1st sub data line and at least one of the 2-2nd sub data line and the 4-2nd sub data line.

Each of the plurality of gate lines can be disposed between the first sub pixel and the second sub pixel or between the third sub pixel and the fourth sub pixel.

An odd-numbered gate line among the plurality of gate lines can be disposed between a first sub pixel and a second sub pixel disposed in an odd-numbered column and can be disposed between a third sub pixel and a fourth sub pixel disposed in an even-numbered column.

An even-numbered gate line among the plurality of gate lines can be disposed between a third sub pixel and a fourth sub pixel disposed in an odd-numbered column and can be disposed between a first sub pixel and a second sub pixel disposed in an even-numbered column.

A turn-on order of the plurality of gate lines in an even-numbered frame can be different from a turn-on order of the plurality of gate lines in an odd-numbered frame.

The plurality of gate lines can include a first gate line, a second gate line, a third gate line, and a fourth gate line which can be sequentially disposed, in the even-numbered frame, the first gate line, the second gate line, the fourth gate line, and the third gate line can be turned on in this order, and in the odd-numbered frame, the second gate line, the first gate line, the third gate line, and the fourth gate line can be turned on in this order.

Each of the plurality of sub pixels can include a switching transistor, a driving transistor, a storage capacitor, a sensing transistor, and a light emitting diode and the sensing transistor outputs a voltage for sensing a threshold voltage and a mobility of the driving transistor to the reference voltage line.

Each of the plurality of gate lines can be configured by a double layer including a first electrode layer which can be the same layer as the gate electrodes of the switching transistor, the driving transistor, and the sensing transistor and a second electrode layer which can be the same layer as the source electrodes and the drain electrodes of the switching transistor, the driving transistor, and the sensing transistor.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto.

Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising: a display panel including a plurality of pixels, each of the plurality of pixels including a plurality of sub pixels having different colors; a data driver configured to supply a data voltage to the plurality of pixels via a plurality of data lines; and a gate driver configured to supply a gate signal to the plurality of pixels via a plurality of gate lines, wherein the plurality of sub pixels are sequentially disposed in a same column, each of the plurality of data lines is divided into two sub data lines, and the two sub data lines are disposed on opposite sides of the plurality of sub pixels disposed in the same column; wherein the plurality of sub pixels includes a first sub pixel, a second sub pixel, a third sub pixel, and a fourth sub pixel which are sequentially disposed in the same column, and wherein the first sub pixel includes a first light emitting diode and a first circuit element, the second sub pixel includes a second light emitting diode and a second circuit element, the third sub pixel includes a third light emitting diode and a third circuit element, and the fourth sub pixel includes a fourth light emitting diode and a fourth circuit element; the display device further comprising a plurality of reference voltage lines configured to sense characteristics of the plurality of pixels, wherein a corresponding reference voltage line among the plurality of reference voltage lines is disposed between the first light emitting diode and the first circuit element, between the second light emitting diode and the second circuit element, between the third light emitting diode and the third circuit element, and between the fourth light emitting diode and the fourth circuit element.

2. The display device according to claim 1, wherein an arrangement order of a first group of sub pixels among the plurality of sub pixels disposed in an odd-numbered column is different than an arrangement order of a second group of sub pixels among the plurality of sub pixels disposed in an even-numbered column.

3. The display device according to claim 1, wherein for each of the plurality of sub pixels, the first circuit element and the third circuit element are disposed opposite to the second circuit element and the fourth circuit element with respect to a corresponding reference voltage line among the plurality of reference voltage lines.

4. The display device according to claim 1, wherein the plurality of data lines includes a first data line configured to supply a first data voltage, a second data line configured to supply a second data voltage, a third data line configured to supply a third data voltage, and a fourth data line configured to supply a fourth data voltage, wherein the first data line is divided into a 1-1st sub data line and a 1-2nd sub data line, wherein the second data line is divided into a 2-1st sub data line and a 2-2nd sub data line, wherein the third data line is divided into a 3-1st sub data line and a 3-2nd sub data line, and wherein the fourth data line is divided into a 4-1st sub data line and a 4-2nd sub data line.

5. The display device according to claim 4, wherein the 1-1st sub data line is disposed on one side of a first group of sub pixels among the plurality of sub pixels disposed in an odd-numbered column, and the 1-2nd sub data line is disposed on another side of the first group of sub pixels disposed in the odd-numbered column, wherein the 2-1st sub data line is disposed on one side of a second group of sub pixels among the plurality of sub pixels disposed in an even-numbered column, and the 2-2nd sub data line is disposed on another side of the second group of sub pixels disposed in the even-numbered column, wherein the 3-1st sub data line is disposed on one side of a third group of sub pixels among the plurality of sub pixels disposed in an odd-numbered column, and the 3-2nd sub data line is disposed on another side of the third group of sub pixels disposed in an odd-numbered column, and wherein the 4-1st sub data line is disposed on one side of a fourth group of sub pixels among the plurality of sub pixels disposed in an even-numbered column, and the 4-2nd sub data line is disposed on another side of the fourth group of sub pixels in the even-numbered column.

6. The display device according to claim 4, wherein a high potential voltage line is disposed between at least one of the 1-2nd sub data line and the 3-2nd sub data line and at least one of the 2-1st sub data line and the 4-1st sub data line, and wherein another high potential voltage line is disposed between at least one of the 1-1st sub data line and the 3-1st sub data line and at least one of the 2-2nd sub data line and the 4-2nd sub data line.

7. The display device according to claim 1, wherein each of the plurality of gate lines is disposed between the first sub pixel and the second sub pixel or between the third sub pixel and the fourth sub pixel.

8. The display device according to claim 1, wherein an odd-numbered gate line among the plurality of gate lines is disposed between a first sub pixel and a second sub pixel disposed in an odd-numbered column and is disposed between a third sub pixel and a fourth sub pixel disposed in an even-numbered column.

9. The display device according to claim 1, wherein an even-numbered gate line among the plurality of gate lines is disposed between a third sub pixel and a fourth sub pixel disposed in an odd-numbered column and is disposed between a first sub pixel and a second sub pixel disposed in an even-numbered column.

10. The display device according to claim 1, wherein a turn-on order of the plurality of gate lines in an even-numbered frame is different than a turn-on order of the plurality of gate lines in an odd-numbered frame.

11. The display device according to claim 10, wherein the plurality of gate lines includes a first gate line, a second gate line, a third gate line, and a fourth gate line which are sequentially disposed, wherein in the even-numbered frame, the first gate line, the second gate line, the fourth gate line, and the third gate line are turned on in an order of the first gate line, the second gate line, the fourth gate line, and the third gate line, and wherein in the odd-numbered frame, the first gate line, the second gate line, the fourth gate line, and the third gate line are turned on in an order of the second gate line, the first gate line, the third gate line, and the fourth gate line.

12. The display device according to claim 1, wherein each of the plurality of sub pixels includes:

a switching transistor, a driving transistor, a storage capacitor, a sensing transistor, and a light emitting diode, wherein the sensing transistor is configured to output a voltage for sensing a threshold voltage and a mobility of the driving transistor to a reference voltage line.

13. The display device according to claim 12, wherein each of the plurality of gate lines is configured by a double layer including:

a first electrode layer which is a same layer as gate electrodes of the switching transistor, the driving transistor, and the sensing transistor; and a second electrode layer which is a same layer as source electrodes and drain electrodes of the switching transistor, the driving transistor, and the sensing transistor.

14. A display device, comprising:

a display panel including a plurality of sub pixels having a first group of sub pixels arranged in a first column adjacent to a second group of sub pixels arranged in a second column;

a data driver configured to supply data voltages to the plurality of sub pixels via a plurality of data lines;

a gate driver configured to supply gate signals to the plurality of sub pixels via a plurality of gate lines; and a timing controller configured to control the data driver and the gate driver, wherein the first group of sub pixels are arranged in a first zig-zag pattern, wherein the second group of sub pixels are arranged in a second zig-zag pattern that is shifted in a vertical direction relative to the first zig-zag pattern, and wherein the timing controller is configured to:

drive subpixels having a same color among the first group and the second group according to a first emitting sequence in an odd frame, and drive subpixels having the same color among the first group and the second group according to a second emitting sequence in an even frame, the second emitting sequence being different than the first emitting sequence.

15. The display device according to claim 14, wherein the subpixels having the same color have a same average charging rate across a set of even and odds frames when displaying a same horizontal stripe pattern.

16. The display device according to claim 15, wherein the timing controller is further configured to:

drive the first color sub pixel of the first pixel unit, the first color sub pixel of the second pixel unit, the first color sub pixel of the third pixel unit and the first color sub pixel of the fourth pixel unit arranged in the quadrilateral shape according to a clockwise emitting pattern during an odd numbered frame, and drive the first color sub pixel of the first pixel unit, the first color sub pixel of the second pixel unit, the first color sub pixel of the third pixel unit and the first color sub pixel of the fourth pixel unit arranged in the quadrilateral shape according to a counter-clockwise emitting pattern during an even numbered frame.

17. The display device according to claim 15, wherein the timing controller is further configured to:

drive the first color sub pixel of the first pixel unit, the first color sub pixel of the second pixel unit, the first color sub pixel of the third pixel unit and the first color sub pixel of the fourth pixel unit arranged in the quadrilateral shape according to a counter-clockwise emitting pattern during an odd numbered frame, and drive the first color sub pixel of the first pixel unit, the first color sub pixel of the second pixel unit, the first color sub pixel of the third pixel unit and the first color sub pixel of the fourth pixel unit arranged in the quadrilateral shape according to a clockwise emitting pattern during an even numbered frame.

18. The display device according to claim 15, further comprising:

a voltage reference line dispose along a center of the first zig-zag pattern of the first group of sub pixels, wherein a first data line among the plurality of data lines branches into a first sub data line and a second sub data line, wherein the first sub data line is disposed on one side of the first zig-zag pattern, and the second sub data line is disposed on another side of the first zig-zag pattern.

19. The display device according to claim 14, wherein the first group of sub pixels includes a first pixel unit and a second pixel unit, each of the first and second pixel units including a first color sub pixel, a second color sub pixel, a third color sub pixel and a fourth color sub pixel, wherein the second group of sub pixels includes a third pixel unit and a fourth pixel unit, each of the third and fourth pixel units including a first color sub pixel, a second color sub pixel, a third color sub pixel and a fourth color sub pixel, and wherein the first color sub pixel of the first pixel unit, the first color sub pixel of the second pixel unit, the first color sub pixel of the third pixel unit and the first color sub pixel of the fourth pixel unit emit a same color of light and are arranged in a quadrilateral shape.

20. The display device according to claim 19, wherein the timing controller is further configured to:

select one sub pixel among of the first color sub pixel of the first pixel unit, the first color sub pixel of the second pixel unit, the first color sub pixel of the third pixel unit and the first color sub pixel of the fourth pixel unit arranged in the quadrilateral shape as an initial emitting element in the clockwise emitting pattern, and select a different sub pixel among the first color sub pixel of the first pixel unit, the first color sub pixel of the second pixel unit, the first color sub pixel of the third pixel unit and the first color sub pixel of the fourth pixel unit arranged in the quadrilateral shape as the initial emitting element in the counter-clockwise emitting pattern, wherein the one sub pixel and the different sub pixel do not correspond to a same sub pixel among the first color sub pixel of the first pixel unit, the first color sub pixel of the second pixel unit, the first color sub pixel of the third pixel unit and the first color sub pixel of the fourth pixel unit arranged in the quadrilateral shape.

* * * * *